Figure 1:
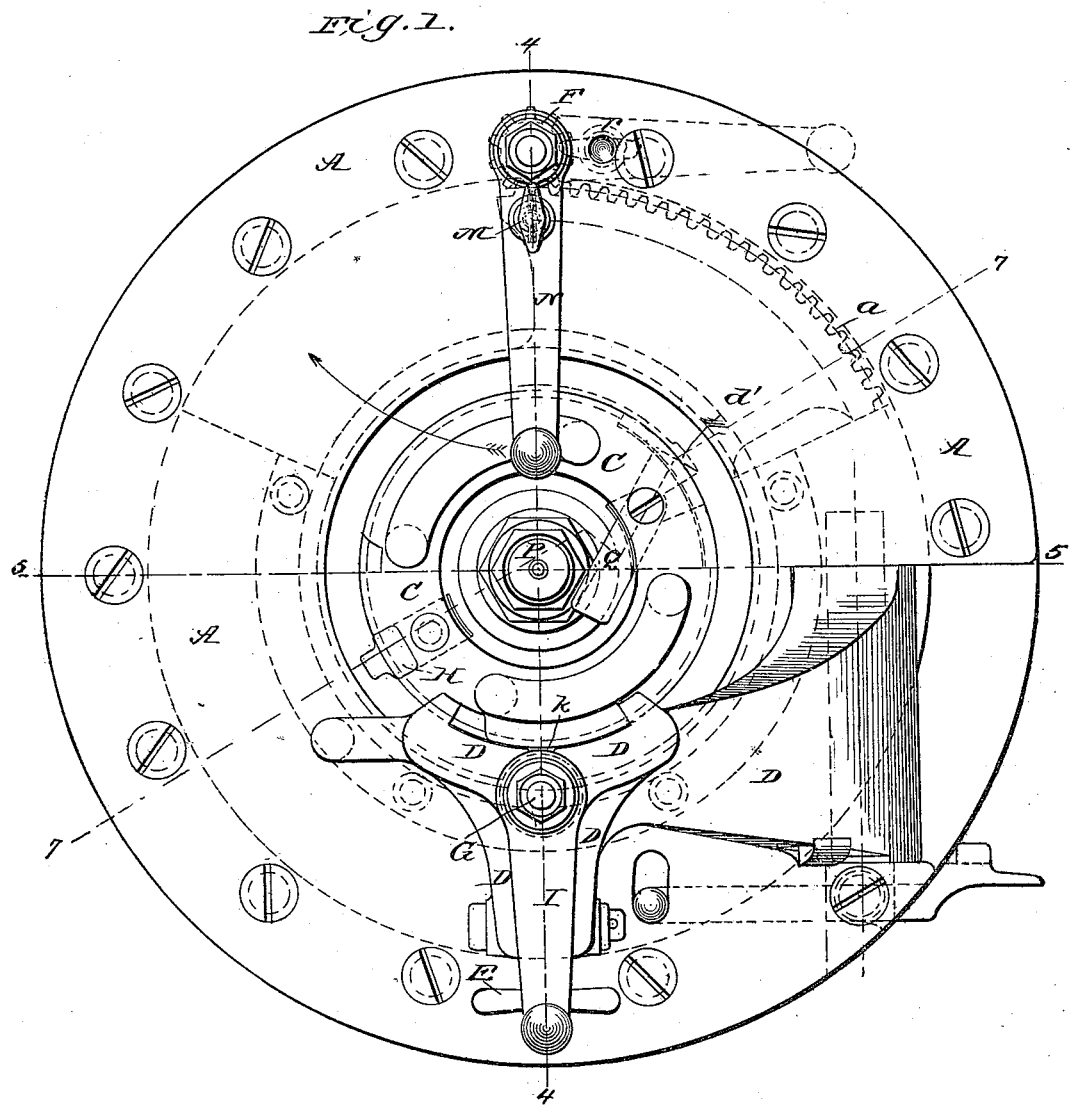

(No Model.) 11 Sheets—Sheet 1.

A. VICTORIN.
BREECH LOADING ORDNANCE.

No. 426,403. Patented Apr. 22, 1890.

WITNESSES
Fred G. Dieterich
Amos W. Hart

INVENTOR:
Anthony Victorin.
BY
Munn
ATTORNEYS (No Model.) 11 Sheets—Sheet 2.
A. VICTORIN.
BREECH LOADING ORDNANCE.
No. 426,403. Patented Apr. 22, 1890.
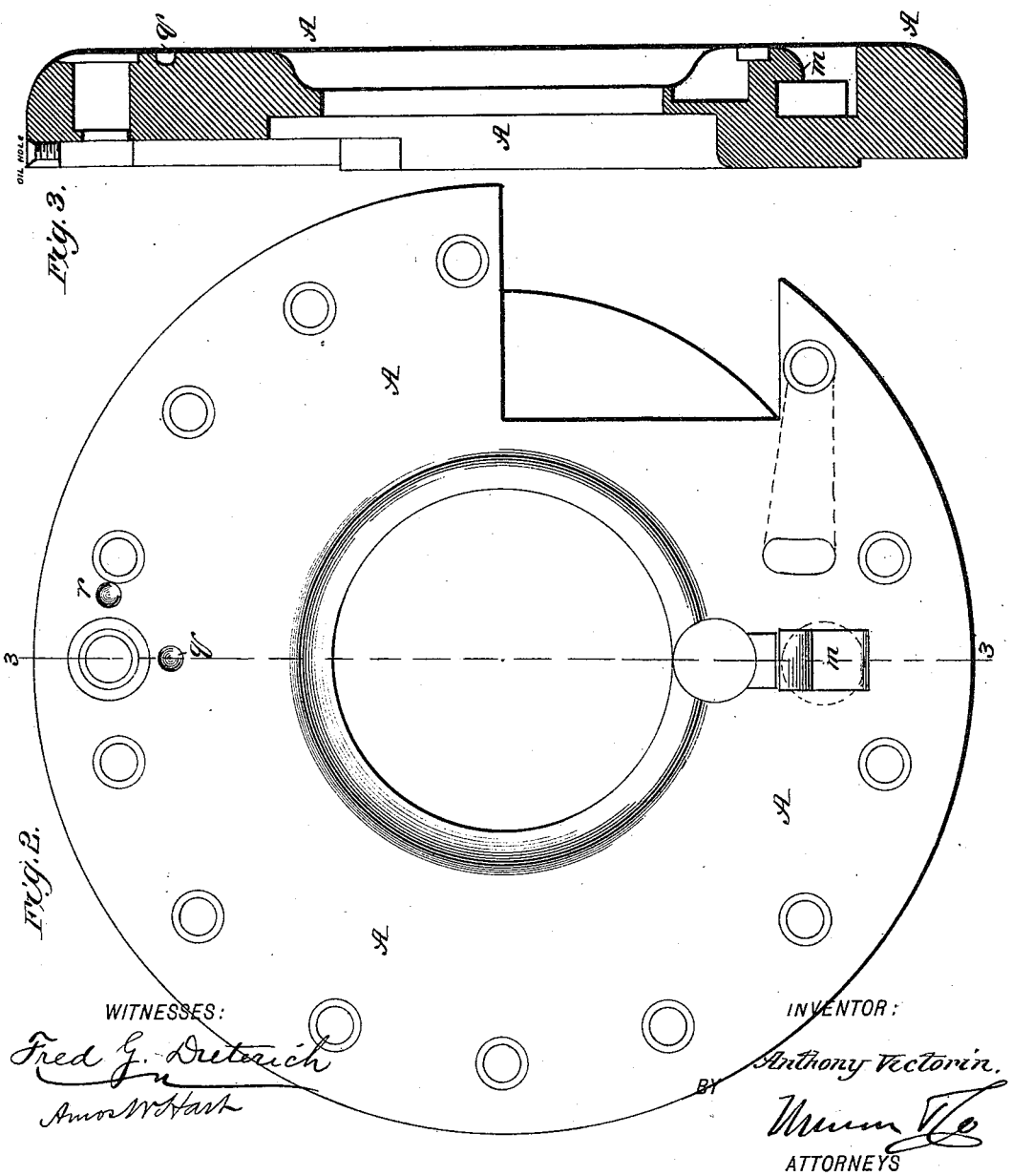

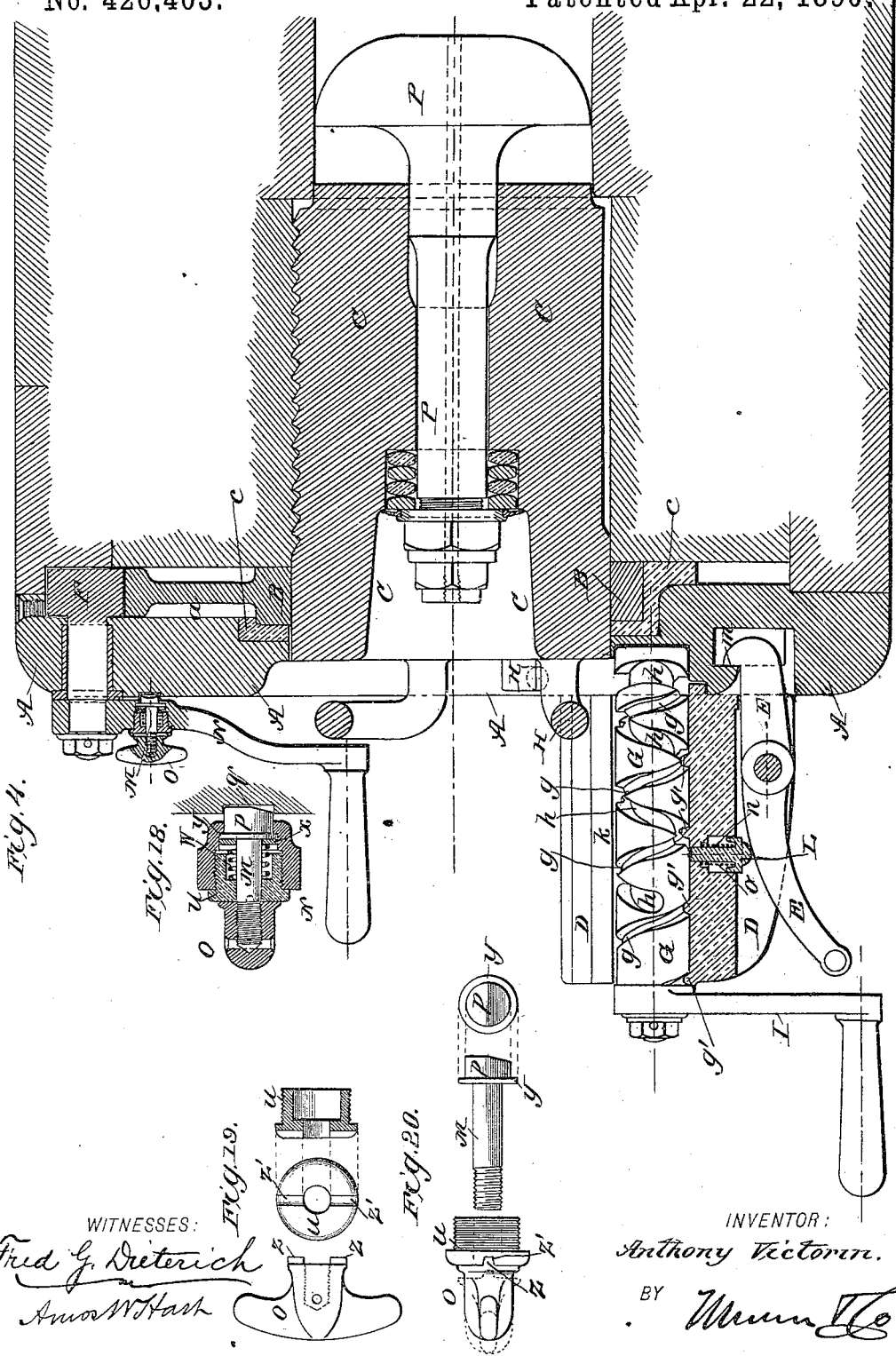

(No Model.) 11 Sheets—Sheet 4.
A. VICTORIN.
BREECH LOADING ORDNANCE.
No. 426,403. Patented Apr. 22, 1890.
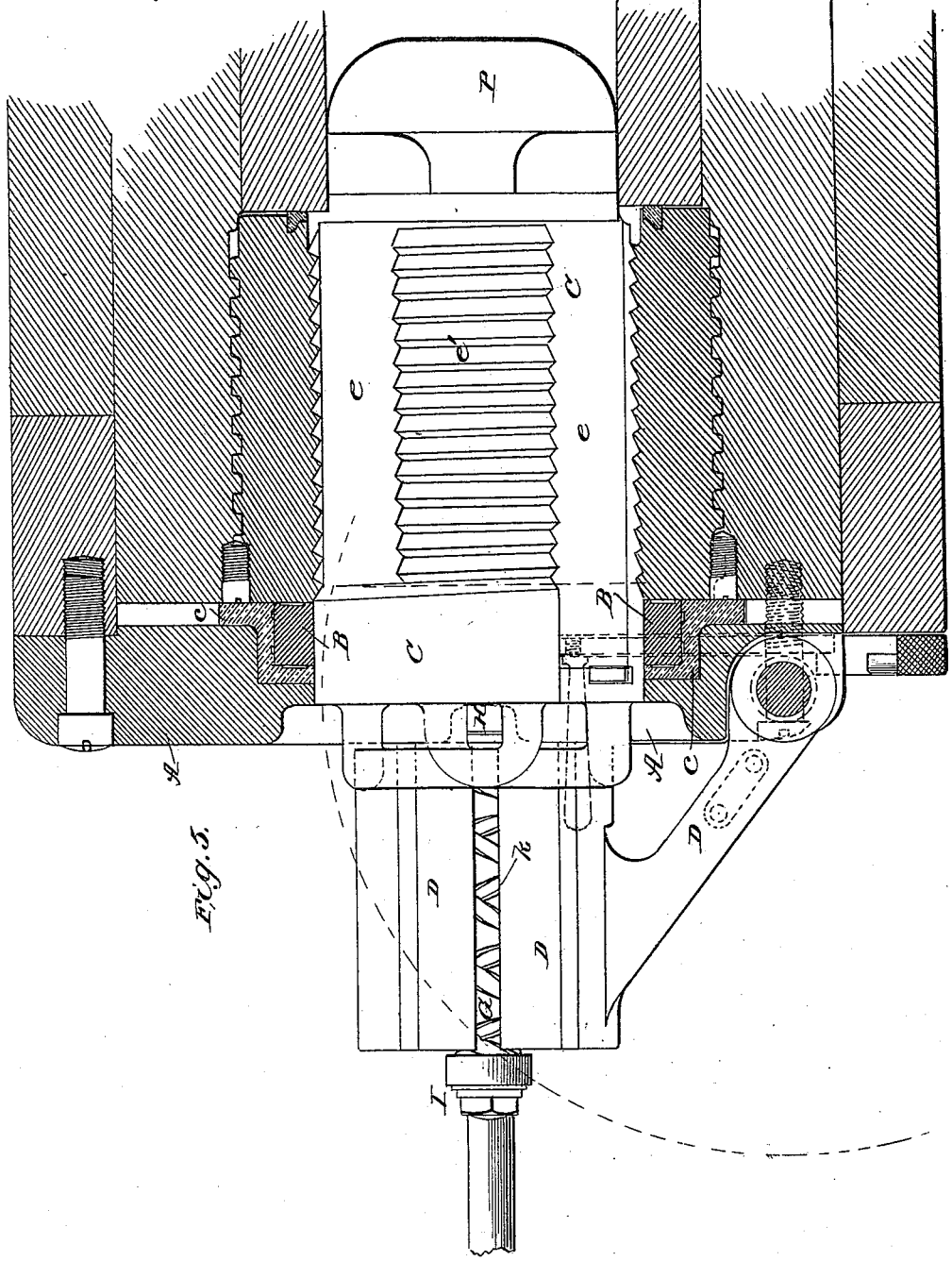
WITNESSES:
INVENTOR:
Anthony Victorin,
BY
ATTORNEYS

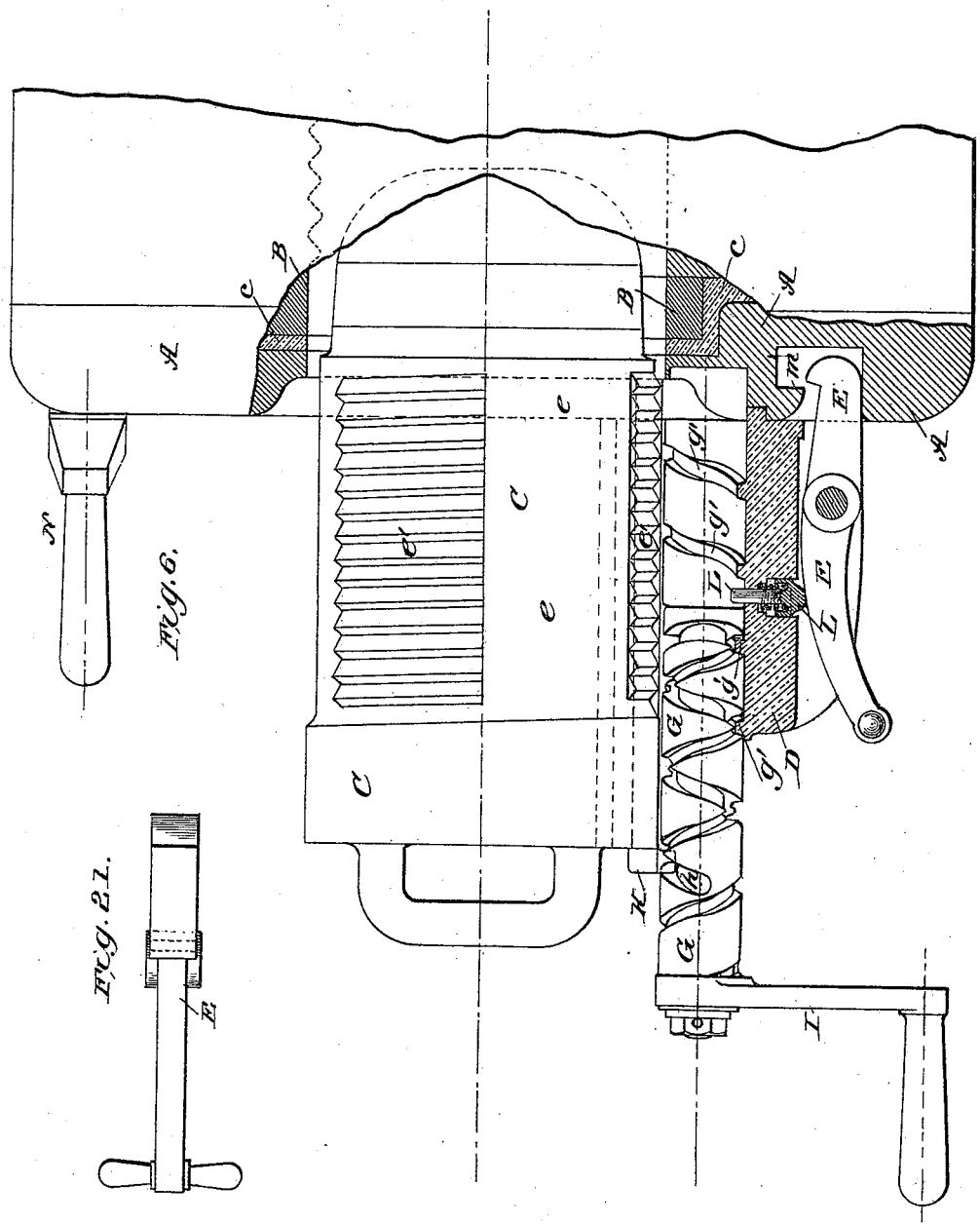

(No Model.) 11 Sheets—Sheet 6.
A. VICTORIN.
BREECH LOADING ORDNANCE.
No. 426,403. Patented Apr. 22, 1890.
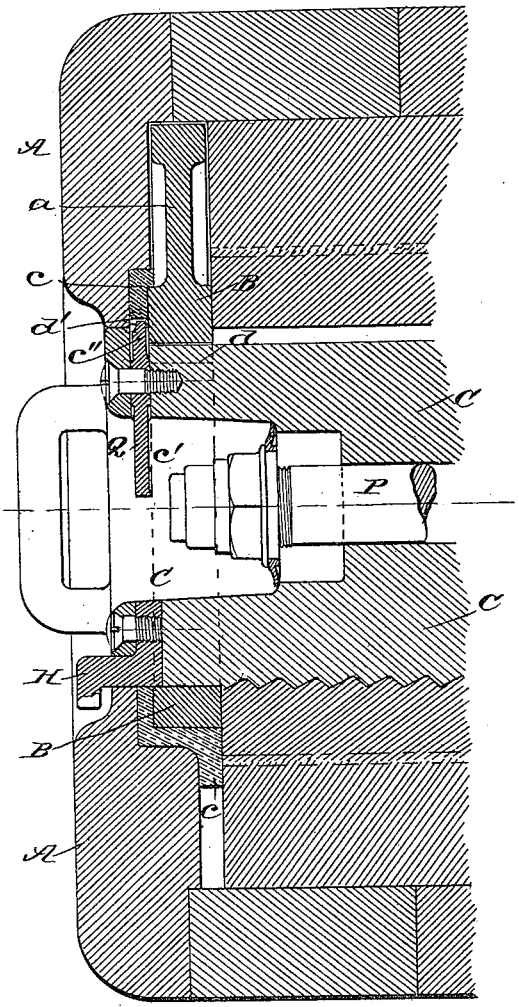
WITNESSES:
Fred G. Dieterich
Amos W. Hart
INVENTOR:
Anthony Victorin.
BY Munn & Co
ATTORNEYS (No Model.)

11 Sheets—Sheet 7.

A. VICTORIN
BREECH LOADING ORDNANCE.

No. 426,403. Patented Apr. 22, 1890.

WITNESSES:
Fred G. Dieterich
Amos W. Hatt

INVENTOR:
Anthony Victorin.
BY
Munn & Co.
ATTORNEYS (No Model.)  11 Sheets—Sheet 8.
A. VICTORIN.
BREECH LOADING ORDNANCE.
No. 426,403. Patented Apr. 22, 1890.
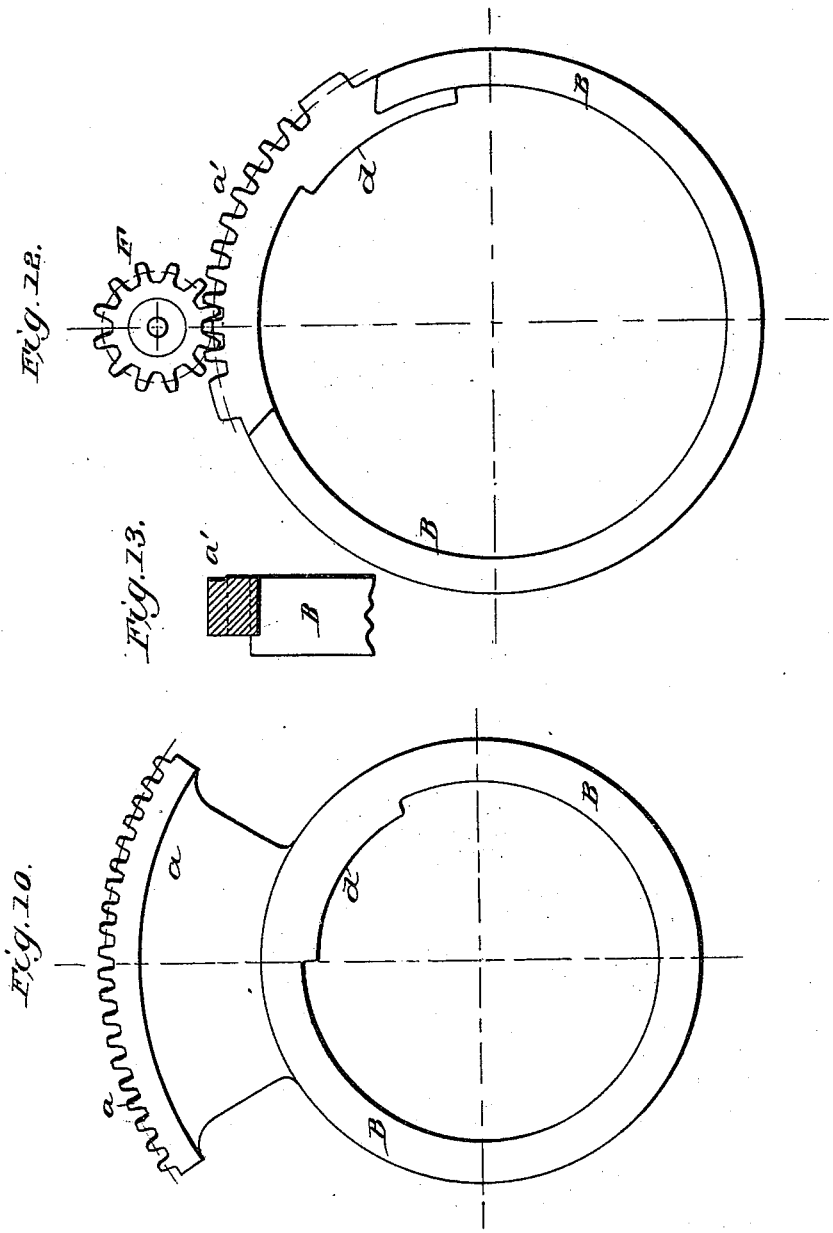
WITNESSES:
INVENTOR:
Anthony Victorin.
BY
ATTORNEYS (No Model.) 11 Sheets—Sheet 9.

A. VICTORIN.
BREECH LOADING ORDNANCE.

No. 426,403. Patented Apr. 22, 1890.

WITNESSES:
Fred G. Dieterich
Amos W. Hart

INVENTOR:
Anthony Victorin.
BY
Munn & Co.
ATTORNEYS

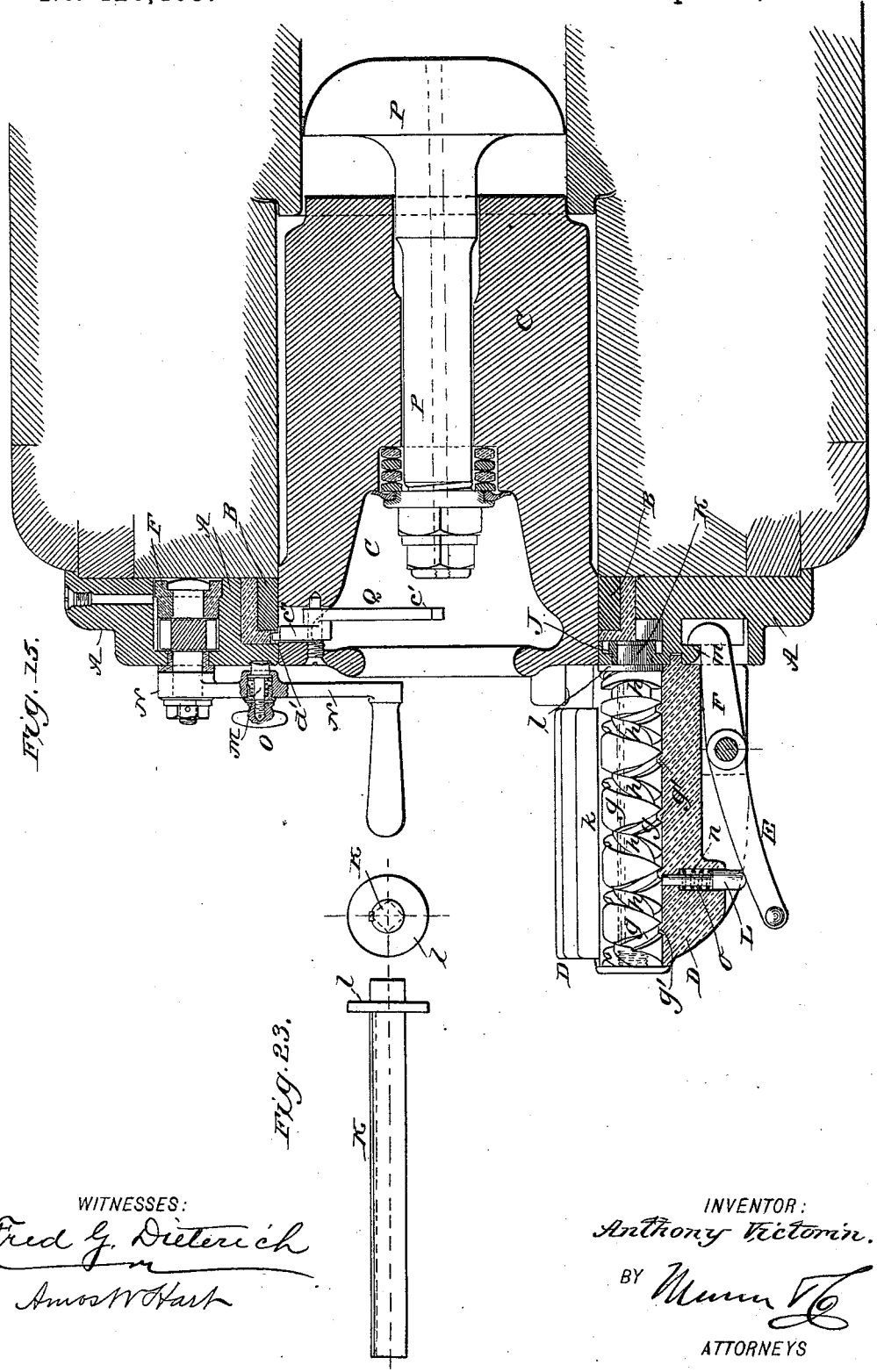

(No Model.) 11 Sheets—Sheet 11.

A. VICTORIN.
BREECH LOADING ORDNANCE.

No. 426,403. Patented Apr. 22, 1890.

WITNESSES:
Fred G. Dieterich
Amos W. Hart

INVENTOR:
Anthony Victorin.
BY
ATTORNEYS

United States Patent Office.

ANTHONY VICTORIN, OF TROY, NEW YORK.

BREECH-LOADING ORDNANCE.

SPECIFICATION forming part of Letters Patent No. 426,403, dated April 22, 1890.

Application filed January 15, 1890. Serial No. 336,986. (No model.)

*To all whom it may concern:*

Be it known that I, ANTHONY VICTORIN, constructing engineer at the Watervliet arsenal, West Troy, and a resident of Troy, Rensselaer county, State of New York, and a citizen of the United States, have made an Improvement in Breech-Loading Ordnance, of which the following is a full and exact description.

My invention pertains to that class of ordnance or cannon having a breech-plug which is provided with an interrupted screw-thread, and which when withdrawn from the gun swings laterally upon a hinged support or so-called "console," thus leaving the breech free for insertion of the charge.

My invention comprises, first, an independent removable annular breech-plate or housing which carries as well as covers and protects the breech mechanism proper; second, improved means for rotating the breech-block and locking the crank-handle by which such operation is effected; third, an improved construction of the rotatable translating roller or cylinder by which the breech-block is forced into and withdrawn from the breech, the same being provided with two intersecting spiral grooves instead of a single groove, as heretofore, whereby an important advantage is obtained; fourth, an improved automatic means for locking and releasing the pivoted latch that secures the swinging breech-block carrier or console closed, as required for firing, and, fifth, an improved automatic cover or guard for the vent that prevents premature insertion of the primer.

Figure 8:
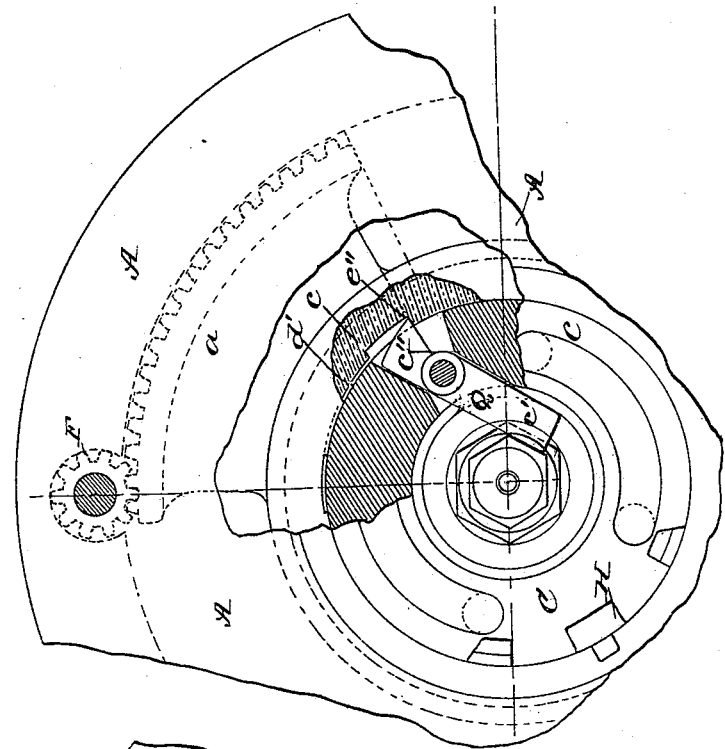
Figure 9:
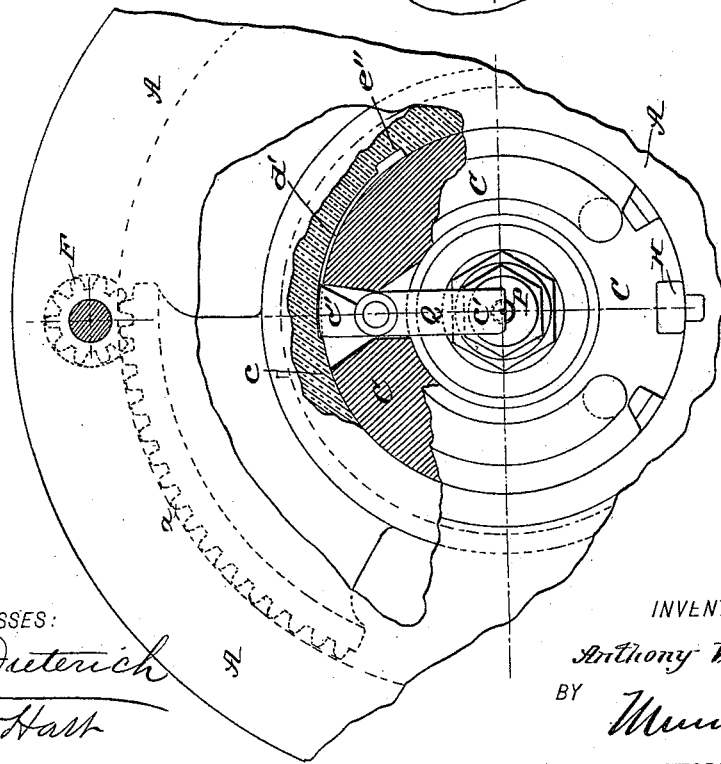
Figure 14:
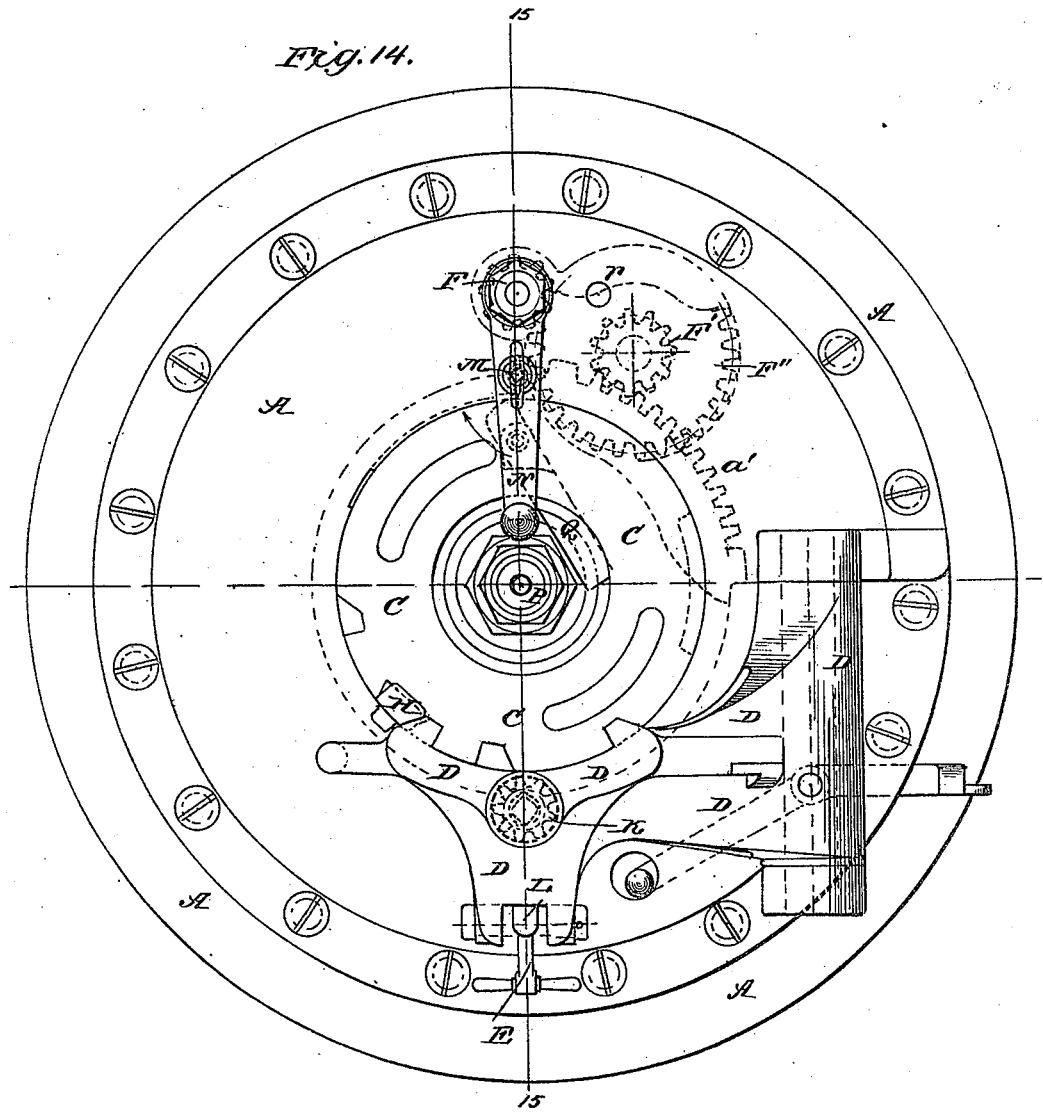
Figure 76:
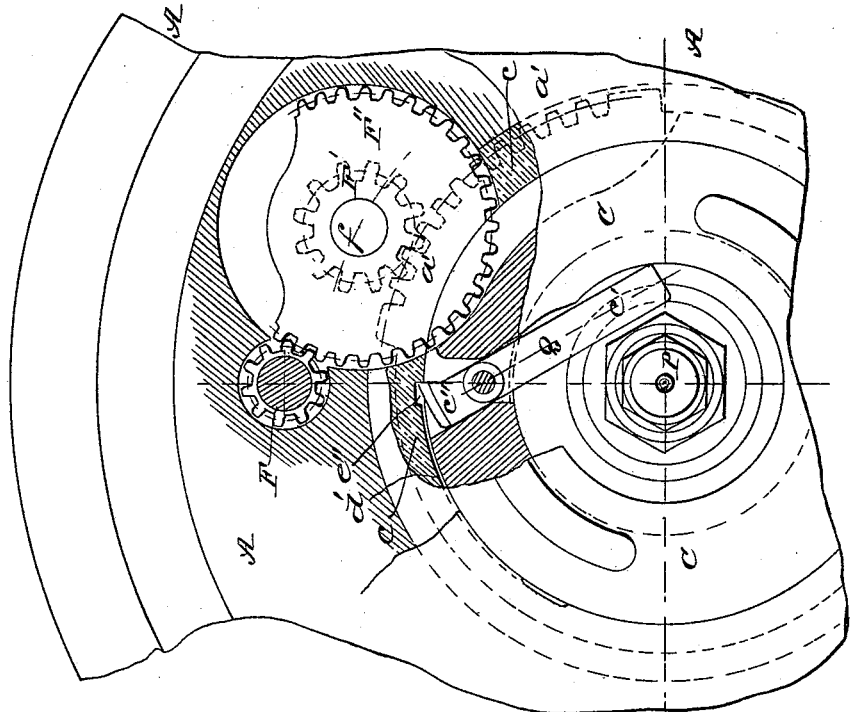
Figure 77:
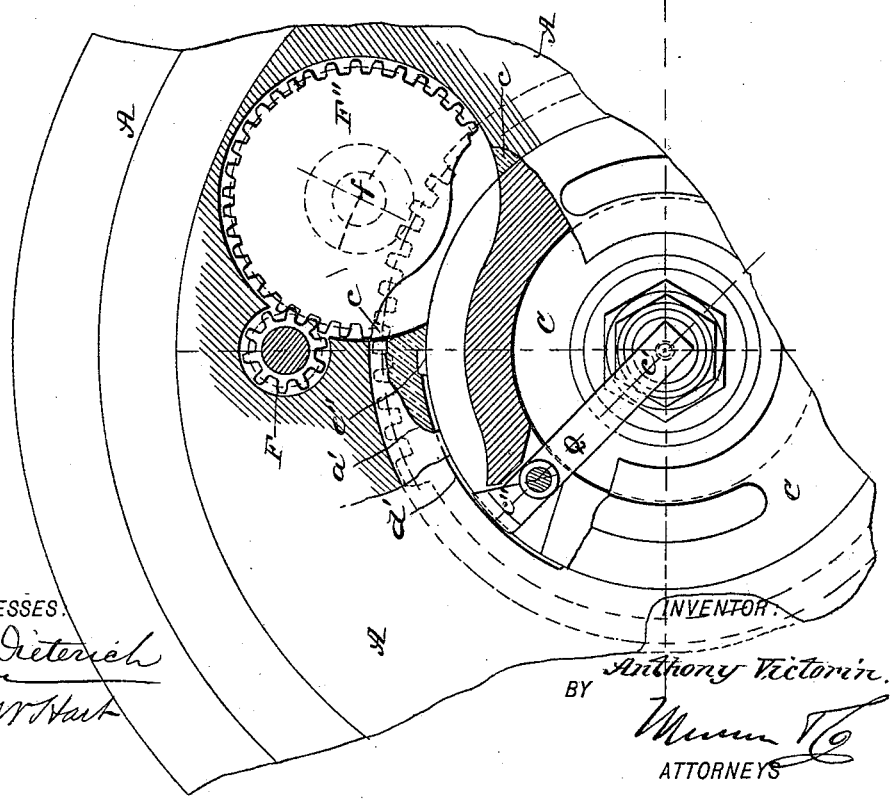

In the accompanying drawings, (eleven sheets,) Figure 1, Sheet 1, is a face view of the apparatus as applied to a piece of ordnance, the movable parts being in position for firing. Fig. 2, Sheet 2, is a face view of the breech-plate or housing detached. Fig. 3, Sheet 2, is a central vertical transverse section of said housing on line 3 3, Fig. 2. Fig. 4, Sheet 3, is a central vertical longitudinal section on line 4 4, Fig. 1, showing the entire breech of the gun. Fig. 5, Sheet 4, is a central horizontal section on line 5 5, Fig. 1. Fig. 6, Sheet 5, is mainly a longitudinal or side elevation, part being in section, showing the breech-block withdrawn from the bore. Fig. 7, Sheet 6, is a diagonal longitudinal section on the line 7 7, Fig. 1, the breech-block being shown in the position required for firing. Figs. 8 and 9, Sheet 7, are detail face views, part being broken away, showing the different positions of the vent-cover. Figs. 10 and 11, Sheet 8, are respectively a face view and cross-section of one form of the toothed ring for rotating the breech-block. Figs. 12 and 13, Sheet 8, are similar views of an alternative form of such ring. Fig. 14, Sheet 9, is a face view corresponding to Fig. 1, save that it shows an alternative means for operating the breech-block ring and double-threaded roller. Fig. 15, Sheet 10, is a central longitudinal section on line 15 15, Fig. 14. Figs. 16 and 17, Sheet 11, are detail views, partly face and partly sectional, showing multiple gearing for operating the breech-block and the two positions of the vent-cover. Fig. 18, Sheet 3, is a detail section showing the locking-bolt applied to the crank that operates the breech-block ring. Figs. 19 and 20, Sheet 3, show such locking-bolt and connected parts. Fig. 21, Sheet 5, is a plan view of the lever-latch for locking the console. Fig. 22, Sheet 6, is an end view of the breech-block stud that works in a groove of the console-roller. Fig. 23, Sheet 10, includes a plan and end view of the spline-rod used as an alternative means for operating the double-threaded roller.

I will first briefly indicate the chief parts of the entire invention or apparatus, referring particularly to Figs. 1 and 4.

The letter A indicates the annular breech-plate or housing attached to the breech of the gun; B, the toothed ring; F, the pinion, and N the crank for rotating the screw breech-block C; M, the bolt for locking said crank, and O a wing-nut for turning such locking-bolt; E, the lever-latch for securing the console in the closed position, and L the bolt for locking the catch in engagement; G, the double-threaded roller or cylinder for translating the breech-block; I, a hand-crank for rotating such roller, and Q the automatic cover or guard for the vent.

The breech-plate or housing A, Figs. 2, 3, 4, and 5, is annular in form and has the same or slightly less diameter than the breech of the gun, to which it is removably attached by screws or other suitable means. The inner side of said plate or housing A is provided with suitable recesses and bores for receiving various parts of the breech mechanism proper—namely, the geared ring B, that rotates the breech-block, also a pinion or multiple gearing (as the case may be) that turns said ring. It is also provided with exterior recesses and oil-holes and is otherwise suitably constructed for attachment of the hinged console D and for engagement of the pivoted latch-lever E that locks the console closed. The following advantages result from the use of this breech-plate or housing: It avoids the necessity of cutting away and the consequent weakening of the breech portion of the gun, which would be required if the breech mechanism were attached directly to the gun. The time required for making the gun is reduced, since the parts of the breech mechanism are assembled on the housing instead of being applied to the gun itself, and are thus held in readiness for attachment to the body of the gun when the latter is prepared for their reception. In shipping the gun, however, the breech mechanism may remain assembled with the gun, it being necessary to detach only the breech-block and console. The housing serves as a means for attaching the console and gearing of the breech mechanism to the body of the gun, the whole mechanism being incased or housed, so that it is protected from dust, sand &c., as well as from injury by contact with external objects, and always kept well oiled. Furthermore, the housing enables the breech mechanism to be conveniently detached from the body of the gun, for the purpose of repair or for transfer to another gun of the same type and caliber.

The breech-block A requires to be rotated a part (in this case one-sixth) of a revolution to lock or unlock its screw-thread. For this purpose I employ the ring B and gearing connected therewith. The ring B may have two different forms, and the gearing will vary correspondingly.

In Figs. 10 and 11 the ring B is shown constructed with a toothed sector or radial extension $a$, whose length is about half the diameter of the ring proper. In such cases a pinion F, Figs. 1, 4, 8, and 9, gears with the sector $a$, and is keyed on a short crank-shaft $b$, which is held and adapted to rotate in suitable bearings arranged in the upper portion of the breech-plate or housing, perpendicular to the face of the latter. By rotating said crank-shaft $b$ the pinion F turns the ring B in its annular seat, which is a bronze ring $c$, held in a suitable recess in the housing A, and it also rotates the breech-block C. The required connection between the ring B and breech-block C is effected by the internal segmental lug $d$, or inward projection of the ring, which has such length and radial width as adapt it to fit with tolerable accuracy, yet permit it to slide freely in, one of the several broad lengthwise grooves $e$ that separate the screw-segments $e'$ of the breech-block. Thus the latter is compelled to rotate with the ring B, which is fixed as to other movement; but it is left unhindered as to the lengthwise movement required to insert it in or withdraw it from the breech.

In the alternative form of the ring B, (shown in Figs. 12, 13, 16, and 17,) the before-described sector is dispensed with, and a toothed segment $a'$ is formed directly on the body of the ring. A multiple gearing, consisting of a small spur-wheel F' and a relatively larger one F'', is interposed between this segment $a'$ and the pinion F on the crank-shaft $b$. Both are keyed on the same axis $f$, which has suitable bearings in the housing A, and the smaller wheel F' meshes with the segment $a'$ and the larger F'' with the the crank-pinion F. This last-described mechanism—namely, the segment-ring B and the multiple gearing—are more particularly adapted for guns of the largest caliber, whose breech-blocks, owing to their diameter and weight, necessarily require more power to rotate them.

In place of imparting the required longitudinal translating movement to the breech-block C by means of a rotating roller or cylinder having a single exterior screw thread or groove, I employ a roller G, Figs. 1, 4, and 6, which is provided with two such threads or grooves $g\,h$—one right hand and the other left—which intersect each other, as shown. The shallower thread or groove $g$ has a uniform pitch, and receives a corresponding thread or rib $g'$, formed on the interior of the slotted tubular casing or box, with which the console D is provided to contain the said roller. The other groove $h$ is deeper and receives the free end of a downwardly-bent stud H, rigidly attached to the rear end of the breech-block C. For rotating the double-threaded roller G a hand-crank I may be affixed to its outer end, as shown; but I may employ an alternative means, which will be presently described. The aforesaid stud H is moved into and out of the groove $h$, in consequence of the initial or final rotary motion of the breech-block C in locking or unlocking. Assuming the breech-block C to be in the bore of the gun and to have been unlocked from the screw-segments of the latter by means of the toothed ring B and its connected gearing, as before described, the stud H will then be engaged with the thread $h$ of the roller G, as shown in Fig. 6, and upon rotating the latter (by means of its crank I) the breech-block C will be drawn out of the gun, since the roller will withdraw from the console D and the stud H be caused to travel simultaneously through a number of the turns or revolutions of the thread $h$, (whose number will be equal to the rotations of the roller,) and also along the straight open slot $k$, Fig. 5, formed in the upper side of the console box or casing. In this operation the effect of the two threads or spiral grooves $g\,h$ of the roller G in the matter of rapidity of effective movement of the breech-block C is such that a very short roller may be employed in place of the long one, which would be otherwise necessary to do the same work in the same time. The importance of thus practically lessening the maximum length of the complete gun is obvious. The groove $h$ for the stud H may have a uniform pitch, or the pitch may be gradually increased from the outer to the inner end of the roller, for the purpose of enabling the translation of the breech-block to be effected with an accelerating speed.

By reference to Figs. 4 and 15 it will be seen that the first turn of the thread $h$ is not uniform with the others, but that its pitch gradually lessens and the thread is finally slightly reversed in direction. This obviously increases the leverage of the screw-thread on the stud H in the initial movement of the breech-block in withdrawal, so that a much greater force may be applied at that time to overcome any resistance that may occur by reason of the gas-check sticking to the bore. When I dispense with a crank I, I employ gearing to rotate the translating-roller G.

In Figs. 14 and 15 I show a pinion J, arranged in a suitable recess in the face of the housing A in alignment with the roller G, and provided with a square axial aperture or socket to receive the squared end of a spline-rod K, that extends axially through the bored roller G. A suitable arrangement of gears serves to transmit rotation to the said pinion, and thereby to the spline-rod K and roller G, thus accomplishing the translation of the breech-block, as before described. A circular collar $l$ is fixed on the spline-rod K, and abuts a shoulder, Fig. 15, on the console D, thus preventing any longitudinal movement of the spline-rod, so that it remains with the console when the latter is swung away from the bore of the gun, and re-enters the socket of pinion J when the console D returns to its former position. This means of operating the roller G is most to be preferred when unusual power is required to effect the desired movement, as in the case of guns of the largest caliber.

The console D is locked closed, or in the position required for firing the gun, as in Fig. 4, by the hooked lever-latch E, which is pivoted to the under side of the console. Its hook is turned upward and engages a shoulder $m$ on the breech-plate A. Such hooked end is also made heavier than the other, but the latter is pressed down by the spring-actuated bolt L, thus engaging the hook automatically with the breech-plate. To hold the latch locked or engaged with the breech-plate until the console is ready to be swung away from the bore, I employ the aforementioned sliding spring-actuated bolt L, which is arranged vertically in a suitable bore $n$ in the under side of the console. Its reduced stem is normally in contact with the roller G, and its enlarged head bears on the lever-latch, Figs. 4 and 15. The spiral spring $o$ encircles the reduced stem of the bolt and tends to press the bolt downward, so that its head rests on the outer arm of the latch. It will now be seen that when the breech-block is in the gun and the roller G consequently lies wholly in the box or casing of the console D the said bolt L is held down, Fig. 4, so that the latch E is locked rigidly and positively, thus preventing its disengagement by the shock of firing or other causes, and consequently obviating all danger that would thence arise; but, as shown in Fig. 6, when the translating-roller G is withdrawn from its casing, the locking-bolt L being no longer held down by the roller, the rear end of the latch may either be pulled up manually or the lever allowed to disengage automatically in consequence of the location of its pivot below the level of the hook and due adjustment of the tension of the spring relative to the weighted end of the latch E. The slight shock caused by a stop of the breech-block coming in contact with the console at the end of the longitudinal travel of the breech-block in pulling it out of the gun causes the lever-latch E to tilt and force the bolt L upward, as shown in Fig. 6. Thus the latch is both unlocked and disengaged either manually or automatically from the housing, so that the console D may be swung back, carrying the breech-block out of the way of the bore. When the console is swung back to the firing position, the latch E is immediately tilted automatically by sliding with the back of its hook on the curved front of the catch on the breech-plate till the hook of the latch enters the recess in the breech-plate and is immediately forced up by the action of the spring-actuated bolt L, and thus brought into engagement with the catch $m$ of said breech-plate. The roller G may then be rotated to carry it inward over the bolt and thus lock the latter, and thereby the lever also, securely in place.

It is obviously necessary and important that the crank for operating the pinion F (or the multiple gearing F' F'') shall be locked immovably during the operation of loading when the breech is open, since premature turning of the crank might result in such damage to the breech mechanism as to disable the gun. For this purpose I employ the means illustrated in Figs. 18, 19, and 20. The chief element is a spring-pressed sliding bolt M, having its shouldered head $p$ beveled and adapted to enter either of the two sockets $q\ r$, Figs. 1, 2, and 4, formed in the housing, as will be presently further explained. The bolt M works transversely through the crank-handle N and locks it in vertical position, Figs. 1 and 4, as required for firing, or in the horizontal position, Figs. 1 and 6, which it invariably assumes when the breech-block has been rotated far enough to unlock its screw. The bolt-head $p$ is cylindrical and works in a corresponding bore in the handle N, while its stem works in a cup or thimble shaped guide $u$, Figs. 18 and 19, which is threaded exteriorly and screwed into the socket, forming the enlarged outer portion of the aforesaid bore in the crank N. A wing-nut O is fixed on the outer end of the bolt M, and a spiral spring $w$ encircles its stem within the cup-shaped guide $u$. A loose washer $x$ is interposed between the spring $w$ and the flanged head $p$ of the bolt M to relieve undue friction. The outer end of the spring $w$ presses against the head of the bolt-guide $u$. The flange $y$ of the bolt-head bears normally against the shoulder of the bore, in which the cylindrical head $p$ works. The inner end of the wing-nut O is constructed with radial diametrically-opposite projections $z\ z$, that are beveled or knife-edged, Fig. 20, and constitute bearings or contact-points that rest normally in correspondingly-arranged recesses or notches $z'\ z'$ formed in the head of the bolt-guide $u$. It is intended that the sides of these radial notches $z'$ shall be sufficiently inclined or beveled to allow the said projections $z$ of the wing-nut O to ride up them, and thus be forced out of the notches $z'$ by the manual application of a moderate tractive and torsional force to the handle portion of the nut. In other words, the bolt M may be retracted against the tension of the spring $w$, and rotated by pulling on the wing-nut O, and also turning it so that its contact-points $z$ are forced laterally out of the notches $z'$. This movement of the bolt M locks and unlocks the handle N in the following manner: One portion—say half—of the end of the bolt-head $p$ is right-angular or perpendicular to its axis, while the other portion is inclined thereto or beveled at an obtuse angle. (See Figs. 18 and 19.) The head fits easily in the shallow sockets $q\ r$ in the housing A, but enters them only to about the depth of the beveled or cut-away portion. Consequently it requires but a moderate force to cause the beveled side of the bolt-head $p$ to ride up and over the edge of either socket $q$ or $r$, and thus free the head $p$ from the socket altogether. Assuming now that the breech is closed and the crank N is in the vertical position and the locking-bolt M engaged in the socket $q$ behind the crank, then if the right-angled side or edge of the bolt-head $p$ is toward the left, as shown in Fig. 4, it will be seen that the crank is locked or held from movement to the left; but if the wing-nut O be pulled and turned half round, as before explained, the bolt-head $p$ will be reversed in position, so that its right and obtuse angled sides change places. Then the bolt-head may be readily forced from the socket and the crank N rotated (to the left) as many times as required to unlock the breech-block. In this operation the bolt-head $p$ drops into the recesses $q$ and $r$ successively at each rotation, but without locking the crank N, because the beveled side of the bolt-head $p$ is in the direction of the motion; but when such movement of the crank N is completed the bolt-head $p$ enters the upper socket $r$ and secures the crank N in horizontal position, Fig. 6, and also locks it against reversal or movement to the right, since the right-angled side of the bolt-head $p$ is then turned in the direction in which the movement must be made; hence the bolt M must be reversed or turned halfway round, preliminary to initiating the rotation of the crank N, for the purpose of again locking the breech-block. It will therefore be perceived that a reversal of rotation of the crank always calls for the preliminary reversal of the bolt to unlock the crank, and also that the bolt itself is held from accidental rotation by means of the engaged bearing or knife edges and the notches in the bolt-guide.

In firing the gun a primer is inserted in the vent or axial bore of the stem of the "mushroom" breech-plug P, and to prevent this being done prematurely and avoid the danger that would thereby result I employ an automatic cover or guard Q for the vent, which, as shown in Figs. 8 and 9, is in the nature of a lever. It is an oblong plate or flat bar (it may, however, have different forms) pivoted in the upper third of its length in a recess in the rear end of the breech-block C and swinging free on its pivot. The longer pendent arm $c$ of said cover swings over and conceals the vent at all times, save when the breech-block C is in position for firing, and then it is automatically moved laterally and held out of the way until the breech-block is again rotated to unlock it. This movement of the vent-cover Q is caused by engagement of the upper end of its shorter arm $c'$ with a shouldered groove $d'$, Figs. 7, 8, and 9, formed at the lower inner edge of the upper portion of the annular breech-plate A. The groove $d'$ is an arc of a circle whose radius is the length of the vent-cover Q, and the upper edge of the upper arm of the latter is constructed on the same curve as the groove, so as to work in easy contact with the bottom of the latter when moving along it.

It may here be noted that the groove $d'$ is shown located at different points on the circle of the bore of the gun in Figs. 14, 16, and 17, in order to accommodate the particular gearing used for actuating the toothed ring B. By the construction and arrangement in either case, as above described, and the consequent contact of the conforming curvatures of the groove and upper arm of the vent-cover, the latter is held in radial position, as in Figs. 9 and 17, when the breech-block C is making its final or locking turn, and in such position the cover effectually guards the vent. The length of the groove $d'$ is, however, so proportioned to the arc through which the breech-block moves that at the instant the latter completes its rotary closing movement the "horn" or slight projection of the upper right-hand corner of the vent-cover, Figs. 9 and 16, comes in contact with the shoulder $e''$, forming the right-hand end of the groove $d'$, and thereby the cover P is swung laterally and uncovers the vent, as shown in Figs. 8 and 16. The bottom of the groove $d'$ is slightly recessed at the right-hand end to accommodate the aforesaid horn when the cover P is thus thrown out of the guard position. The side of the groove $d'$ is also cut away at its other end, as shown in Figs. 8 and 16, to allow the upper arm $c'$ of the vent-cover to pass in and out when the breech-block is being translated.

The order of operation of the parts is as follows: Assuming the breech-block to be locked in the bore of the gun, the first step is to turn the wing-nut O to reverse the position of the locking-bolt M, and the next step is the rotation of the crank N to the left, (see arrow, Figs. 1 and 14,) by which the pinion F turns the ring B and rotates the breech-block one-sixth of a revolution, so that its screw-segments are unlocked from those of the bore. During the above operation the cover Q is automatically moved over the vent. The third step is the rotation of the roller G by means of crank I, thus withdrawing the breech-block from the bore and bringing it onto the console, as represented in Fig. 6. During this translating movement the lever-catch L is automatically released and thus unlocks the console. The fourth and last step is to swing the console laterally to completely open the breech for insertion of the charge, which being done the above-described order of operation is reversed, the console D being swung back and the latch E manually engaged with the shoulder of the breech-plate, as shown in Fig. 4. Then the roller G is rotated (to the left) to carry the breech-block into the bore, when the bolt M is reversed to unlock the crank I, which is next rotated to the right, thus rotating the breech-block and finally locking it in the bore, when the crank itself will be locked by said bolt M in the vertical position, as shown in Figs. 1, 4, 14, and 15. In such locking movement of the breech-block the cover Q automatically uncovers the vent, and the gun is ready for firing.

What I claim is—

1. The independent removable annular breech-plate or housing for breech-loading ordnance, the same having an inner recess and a transverse bore, respectively, adapted to receive the pinion and geared ring for operating the breech-block and the shaft of the pinion that engages said ring, substantially as shown and described.

2. The combination, with a breech-loading gun or cannon, of the removable annular breech-plate or housing having transverse bores to receive fastening-screws and a pinion-shaft, and provided with inner recesses for the breech-block ring and the gearing that operates it, also with exterior recesses for reception and engagement of a crank-lock and the console-latch, respectively, substantially as shown and described.

3. The ring for rotating the breech-block, the same having a toothed exterior peripheral section for meshing with suitable operating-gearing, and an interior lug for sliding engagement with a longitudinal groove in the breech-block, as shown and described.

4. The combination, with the body of the gun having the breech provided with an interrupted screw, and the rotatable breech-block having a corresponding interrupted screw, of the rotatable ring held and guided in its reciprocating movement, as specified, and having a toothed peripheral section and interior lug, gearing adapted to mesh with such toothed section, and means for operating said gearing, substantially as shown and described.

5. The combination, with the annular breech-plate or housing secured to the body of the gun and the latter having its bore provided with separated screw-segments, and the rotatable breech-block having exterior screw-segments and intervening grooves or vacant spaces, of the rotatable ring held in a recess in the housing, gearing which is also attached to the housing, and a rotatable shaft and crank arranged, as shown and described, for rotating together the gearing, ring, and breech-block, as set forth.

6. The combination, with the breech-bored body of the gun, having an interior interrupted screw, the breech-block having a corresponding interrupted exterior screw, and the recessed and bored housing secured to the breech, of the ring B, fitted and adapted to reciprocate circularly in the housing, and provided with the peripherally-toothed sector $a$, the pinion F, engaging said sector, and the shaft of said pinion projecting through the outer face of the housing, and the crank N, applied thereto, as shown and described.

7. The combination, with a breech-loading gun having breech-sockets, a rotatable crank, and suitable connecting mechanism for rotating a breech-block, of the spring-pressed locking-bolt attached to said crank and having a beveled head and a suitable handle, and adapted to turn and slide for engaging with and disengaging from the breech of the gun, as set forth.

8. The combination, with the housing having exterior sockets $q$ and $r$, the rotatable screw breech-block, a toothed ring which engages it, as specified, gearing for rotating said ring, the crank-shaft, and a crank having a transverse bore or perforation, of a locking-bolt held and working in said bore of the crank and adapted to detachably engage the said sockets, as shown and described.

9. The combination of the rotatable spring-pressed crank-locking bolt having its head beveled, as specified, and a suitable handle for turning it, with the breech-plate having sockets for receiving said bolt-head, the crank to which the bolt is applied, and the rotatable gearing, toothed ring, and breech-block, all as shown and described.

10. The combination, with a breech-loading gun having breech-sockets, a crank for rotating the breech-block, and the spring-pressed crank-locking bolt arranged in a suitable bore of the crank, which is provided with notches or sockets contiguously arranged, of a wing-nut or handle fixed on the outer end of said bolt and having beveled bearings or contact-points, as shown and described, for the purpose specified.

11. The combination of the wing-nut or handle having beveled or knife-edged bearings, with the rotatable sliding spring-pressed bolt having a portion of the face or end of its head beveled, as described, the crank having corresponding notches located around the bore wherein the bolt is fitted, and having beveled or inclined sides to permit the described engagement and disengagement of the said bearings, the breech of the gun provided with sockets to receive the aforesaid bolt, and the rotatable breech-block and means for operatively connecting it with said crank, substantially as shown and described.

12. The cup-shaped and axially-bored bolt-guide having shallow radial notches in its face, the crank having a transverse bore in which such guide is secured, the bolt fitted to slide and rotate in the guide and having an enlarged beveled head, a spiral spring which encircles the bolt-stem within the guide, and the wing-nut having beveled bearings, in combination with the gun having breech-sockets, and the rotatable breech-block and means for operatively connecting it with the said crank, substantially as shown and described.

13. The combination, with a breech-bored gun, a breech-block adapted to slide therein, and a hinged console having a longitudinally-slotted screw-threaded box or casing, of the translating roller or cylinder arranged in said casing and having two intersecting spiral grooves, one for engagement with a projection of the breech-block and the other with the thread of the console-casing, and means for rotating said roller, substantially as shown and described.

14. The combination of the roller having two intersecting spiral grooves, one of which has a decreased pitch at its inner end, with the threaded console-box, the breech-block having the stud for engaging the groove having such differential pitch, and the breech-bored body of the gun, substantially as shown and described, for the purpose specified.

15. The combination, with the body of the breech-loading gun and the swinging console or breech-block carrier, of the pivoted lever-latch and a locking-bolt suitably attached to the console and adapted to engage the latch for holding it normally engaged with the breech of the gun, substantially as shown and described.

16. The combination of a pivoted console-latch and a sliding bolt for locking it, with the swinging console, the sliding breech-block, and a translating-roller having endwise movement, whereby it is adapted to co-operate with the latch and roller, as shown and described.

17. The combination of the pivoted and hooked lever, console-latch, and the spring-actuated sliding bolt for locking it, with the swinging console, and the spirally-grooved translating-roller adapted for rotating and endwise movement, the said bolt being normally in contact with the roller and the outer arm of the latch, whereby it is adapted to hold the latter locked or to automatically release it, according to the position of the roller and the breech-block, for firing or loading the gun, as set forth.

18. The combination of the pivoted vent-cover, swinging at right angles to the axis of the gun, with the rotating breech-block, and a contact or abutting shoulder on the gun-breech, to the rear end of which it is attached, substantially as specified.

19. The combination, with the rotary breech-block and the gun-breech having a groove and terminating shoulder or abutment, of the swinging vent-cover pivoted to the rear end of said breech-block, and having the end of its upper arm constructed on the same curvature as said groove, substantially as shown and described, for the purpose specified.

20. The combination of the vent-cover with the rotary breech-block, to whose rear end it is pivotally attached, and the gun-breech, having a groove to receive and a terminating-shoulder to engage the upper arm of the vent-cover, as shown and described, whereby the latter is adapted to operate automatically for guarding and uncovering the vent, according to the position of the breech-block, as specified.

21. The combination, with the rotary breech-block and the gun-breech having an arc groove with terminal shoulder and depression located contiguously, of the swinging vent-cover pivoted to the rear end of said breech-block, and whose upper arm conforms to the curvature of said groove and works in contact with the bottom thereof, and is also provided with a horn or projecting corner portion adapted for engagement with said shoulder and to enter said depression, as shown and described.

22. The combination, with the rotary breech-block and the gun-breech having an arc groove with notched or cut-away portion at one end, of the swinging vent-cover pivoted to the rear end of said breech-block, and whose upper arm conforms to and works in said groove and is adapted to pass through the said notch, as shown and described.

23. The combination, with the rotary breech-block of the swinging vent-cover, pivoted to the rear end of the former, the crank and gearing, and the bolt for holding said crank locked, the gun-breech having a shoulder with which the vent-cover engages when the crank has been rotated to the locking position preparatory to firing, substantially as shown and described.

24. The combination, with the grooved and shouldered gun-breech, of the pivoted swinging vent-cover, the screw breech-block having rotary and endwise movement, the means for rotating and locking the breech-block and the spirally-grooved roller for translating the same, the console-latch and its locking-bolt, the crank and gearing for rotating the breech-block, and the bolt for locking said crank, all as shown and described.

ANTHONY VICTORIN.

Witnesses:
ALFRED CHRISTIANSEN,
WINFIELD S. ROGERS.